US012375758B2

(12) United States Patent
Marom et al.

(10) Patent No.: US 12,375,758 B2
(45) Date of Patent: *Jul. 29, 2025

(54) SMARTPHONE-BASED CONDITIONAL ACCESS SYSTEM

(71) Applicant: Synamedia Limited, Staines Upon Thames (GB)

(72) Inventors: Rotem Marom, Jerusalem (IL); Michal Irit Devir, Jerusalem (IL); Tzachy Reinman, Elazer (IL)

(73) Assignee: SYNAMEDIA LIMITED, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,148

(22) Filed: Jul. 11, 2022

(65) Prior Publication Data

US 2022/0353572 A1    Nov. 3, 2022

Related U.S. Application Data

(62) Division of application No. 16/822,783, filed on Mar. 18, 2020, now Pat. No. 11,432,040.

(51) Int. Cl.
*H04N 21/441* (2011.01)
*H04N 21/235* (2011.01)
(Continued)

(52) U.S. Cl.
CPC ......... *H04N 21/441* (2013.01); *H04N 21/235* (2013.01); *H04N 21/26613* (2013.01); *H04N 21/43856* (2013.01); *H04N 21/4623* (2013.01)

(58) Field of Classification Search
CPC ............... H04N 21/441; H04N 21/235; H04N 21/26613; H04N 21/43856; H04N 21/4623
See application file for complete search history.

(56) References Cited

U.S. PATENT DOCUMENTS 10,055,553 B2 *   8/2018   Fahrny ............. H04N 21/64715
2002/0194615 A1  12/2002   Brodigan et al.
(Continued)

OTHER PUBLICATIONS

Partial Search Report for corresponding EP Appl. No. 21163225.2 dated May 14, 2021.

*Primary Examiner* — Joshua D Taylor
(74) *Attorney, Agent, or Firm* — Fernando & Partners, LLP

(57) ABSTRACT

Techniques for a smartphone-based conditional access (CA) system are described. In some embodiments, a headend in the CA system obtains a security profile associated with a pair of receiving devices used by a user, e.g., a first device (e.g., a smartphone) and a second device (e.g., a set-top-box or a TV). The headend dynamically regulates user access to requested media content during each entitlement period by assigning and distributing separate keys to the first and second device based on the security profile. The headend also uses the distributed keys to protect the media content before broadcasting. On the receiving end, one receiving device receives the media content and determines whether it is decryptable by the device. If decryptable, the receiving device (e.g., the set-top-box/TV) decrypts the media content using the keys assigned by the headend. Otherwise, the receiving device forwards the media content to the pairing device for decryption.

17 Claims, 7 Drawing Sheets

(51) Int. Cl.
    *H04N 21/266*     (2011.01)
    *H04N 21/4385*    (2011.01)
    *H04N 21/4623*    (2011.01)

(56) References Cited

U.S. PATENT DOCUMENTS

| | | | |
|---|---|---|---|
| 2007/0256142 A1* | 11/2007 | Hartung | G06F 21/604 |
| | | | 726/28 |
| 2008/0195860 A1 | 8/2008 | Bedekar et al. | |
| 2009/0320058 A1* | 12/2009 | Wehmeyer | H04N 21/2221 |
| | | | 725/63 |
| 2010/0251304 A1* | 9/2010 | Donoghue | H04N 21/4755 |
| | | | 725/46 |
| 2011/0055886 A1* | 3/2011 | Bennett | H04L 63/18 |
| | | | 370/328 |
| 2012/0051541 A1 | 3/2012 | Wang | |
| 2013/0046990 A1 | 2/2013 | Fahrny et al. | |
| 2013/0166694 A1 | 6/2013 | Joe | |
| 2014/0201533 A1 | 7/2014 | Kruglick | |
| 2014/0208384 A1 | 7/2014 | Youssefian et al. | |
| 2014/0344850 A1* | 11/2014 | Wajs | H04N 21/4623 |
| | | | 725/31 |
| 2014/0373042 A1* | 12/2014 | Le Pelerin | H04N 21/4623 |
| | | | 725/31 |
| 2014/0373104 A1 | 12/2014 | Gaddam et al. | |
| 2015/0019440 A1 | 1/2015 | Yang | |
| 2015/0312525 A1 | 10/2015 | Candelore | |
| 2016/0021327 A1* | 1/2016 | Wang | H04N 21/4113 |
| | | | 348/734 |
| 2017/0090598 A1* | 3/2017 | Morrison | G06F 3/046 |
| 2017/0126644 A1 | 5/2017 | Ullrich et al. | |

* cited by examiner

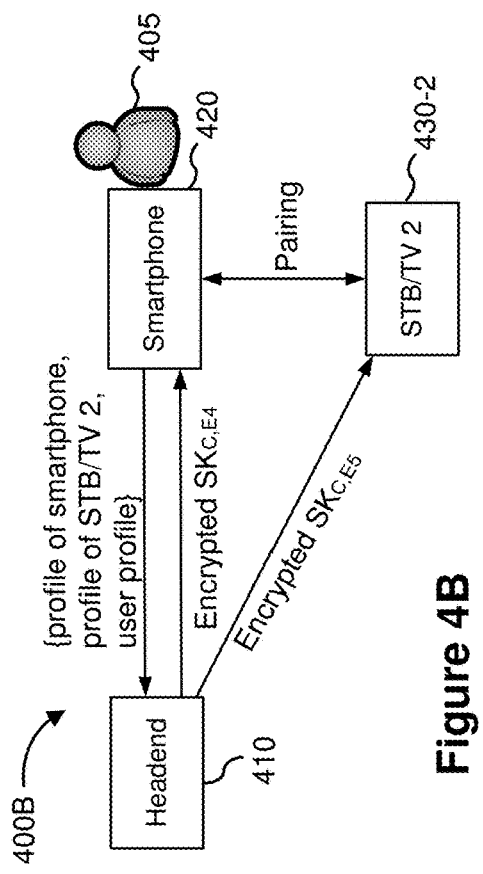
Figure 4B
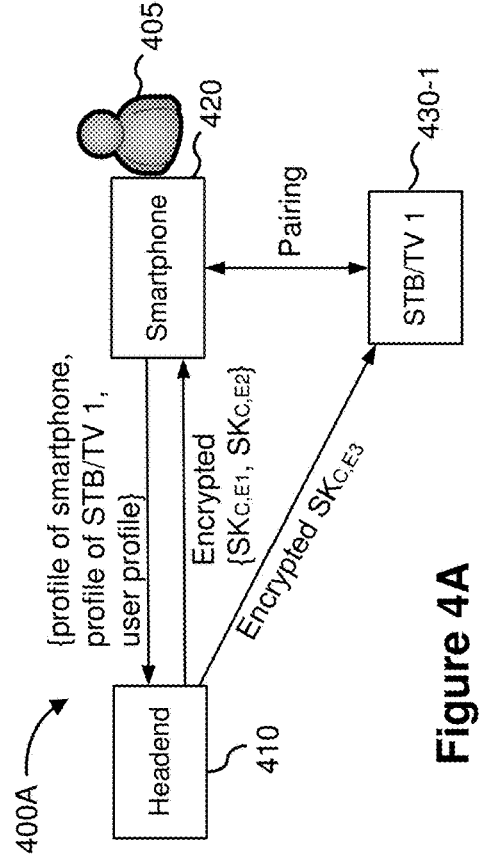
Figure 4A
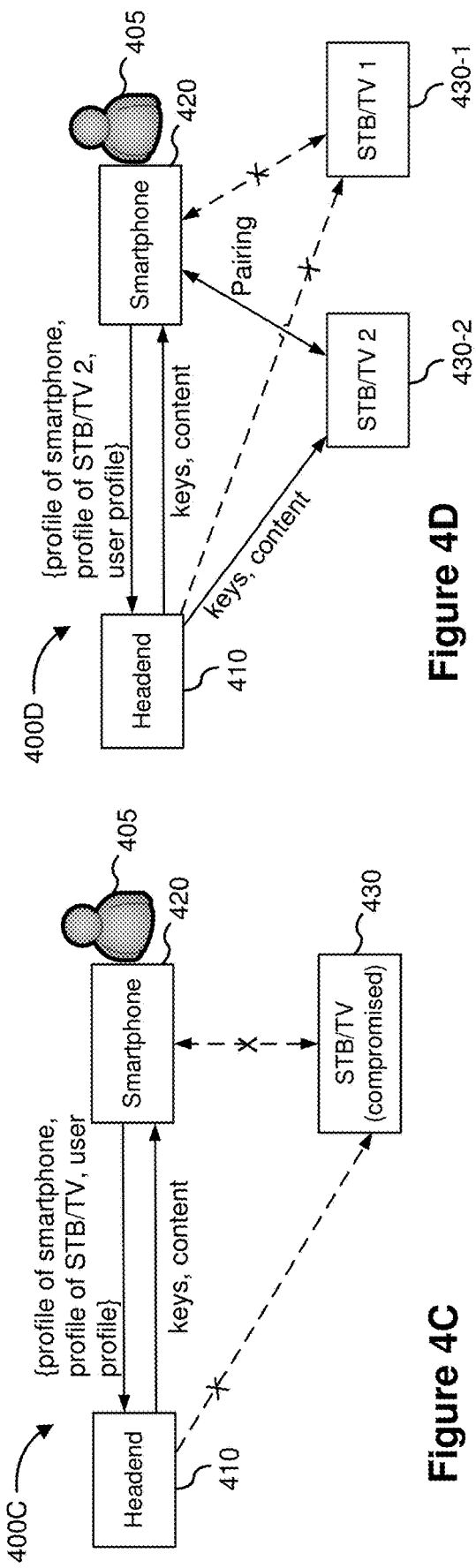
Figure 4D
Figure 4C

SMARTPHONE-BASED CONDITIONAL ACCESS SYSTEM

CROSS-REFERENCE TO RELATED APPLICATIONS

This application is a divisional of U.S. patent application Ser. No. 16/822,783, filed on Mar. 18, 2020, and hereby incorporated by reference in its entirety.

TECHNICAL FIELD

The present disclosure relates generally to conditional access to media content from an end-user device.

BACKGROUND

Conditional access (CA) systems are exposed to various attacks, such as cloning, CA service manipulation, entitlement manipulation, key sharing, and content sharing. In order to reduce these attacks, some CA systems rely on security enhanced set-top-box (STB) chips as security anchors. However, such hardware-based solutions drive up the cost and create a single point of failure. Some solutions attempt to enhance security by applying watermarking. Such software-based solutions have limitations. For instance, downstream support cannot be relied upon in headend-based watermarking, e.g., content detection in non-unicast systems can take a long time. In another example, since client-based watermarking relies on the device security, it is expensive to perform watermarking in the STB.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 4A-4D are block diagrams illustrating dynamic key and content delivery in smartphone-based CA systems in accordance with some embodiments;

Figure 1:
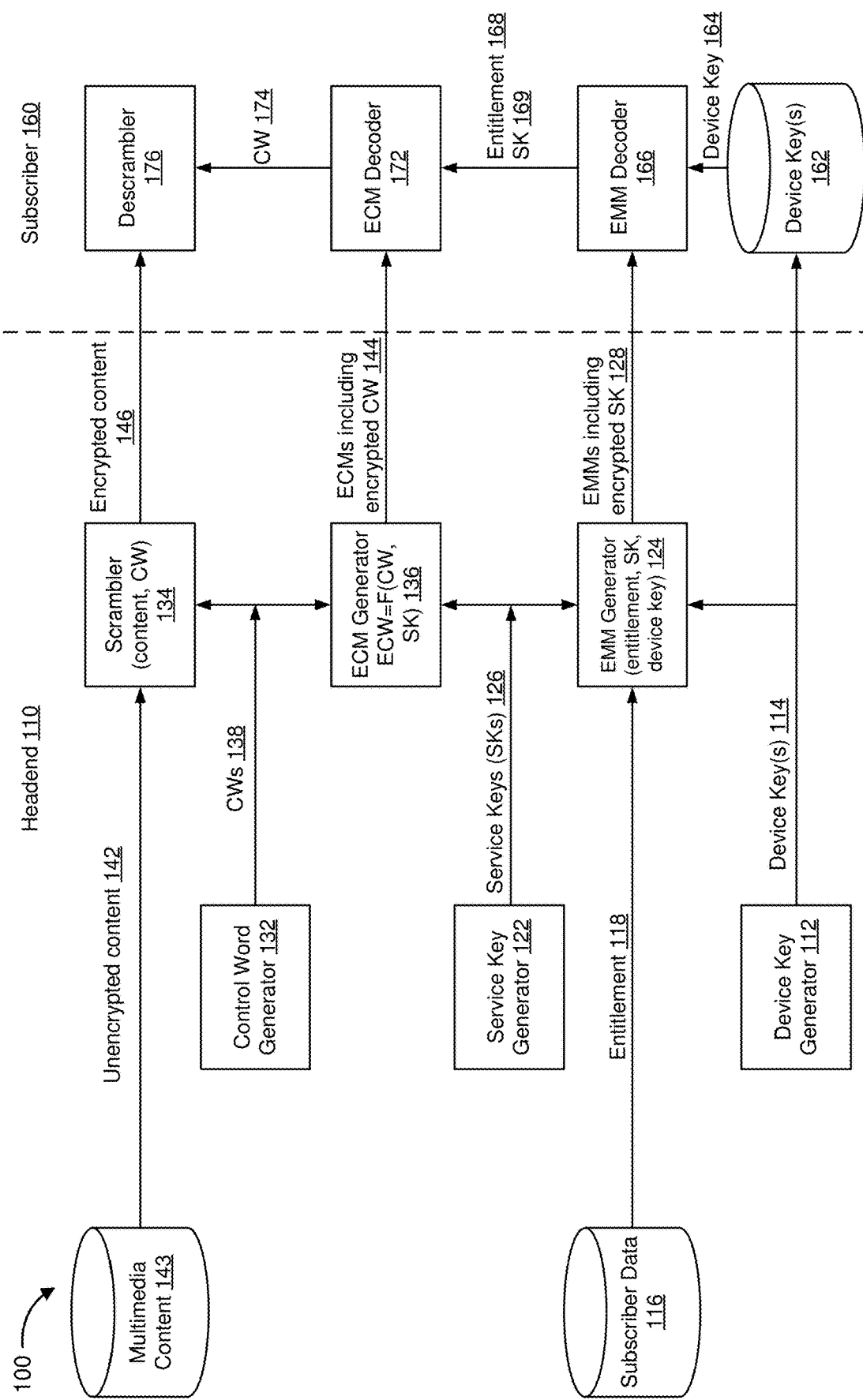
FIG. 1 is a block diagram of an exemplary conditional access (CA) system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Techniques for using a smartphone, or a similar end-user device, as a building block in a security enhanced conditional access (CA) system are described herein.

Smartphones are common end-user devices. Typically, smartphones have more capable resources (e.g., CPUs and/or two-way transport paths) than set-top-boxes (STBs) and are more difficult to clone. Various embodiments disclosed herein use smartphones as a building block in a security enhanced CA system.

In accordance with various embodiments, a method is performed at a headend. The method includes obtaining a security profile associated with a first device, a second device paired with the first device, and a user. The method further includes locating a first device key for the first device and a second device key for the second device. The method additionally includes regulating user access to a channel during an entitlement period, which further includes determining a first security ranking of the first device and a second security ranking of the second device based on the security profile, and assigning a first subset of service keys to be encrypted with the first device key and a second subset of service keys to be encrypted with the second device key based on the first security ranking and the second security ranking. The method also includes transmitting the first subset of service keys to the first device and the second subset of service keys to the second device.

In accordance with various embodiments, a method is performed at a headend. The method includes scrambling media content associated with a channel during an entitlement period, which further includes encrypting the media content using at least one control word to generate encrypted media content, and selectively encrypting the at least one control word with a service key from a first subset of service keys assigned to a first device or a second subset of service keys assigned to a second device paired with the first device in order to generate at least one encrypted control word. The method also includes transmitting the at least one crypted control word along with the encrypted media content to at least one of the first device or the second device.

Example Embodiments

As described above, many conditional access (CA) systems rely on set-top-boxes (STBs) for security. FIG. 1 illustrates a block diagram of an exemplary CA system 100. The exemplary CA system 100 includes a server side and a client side, as indicated by the dotted line. For example, the server side can include a headend 110, and the client side can include a subscriber device 160, such as an STB. In some embodiments, the headend 110 includes a device key generator 112, which generates and delivers on demand unique device key(s) 114 to the subscriber device 160. Once delivered, the subscriber device 160 stores the received device key(s) 114 in an internal or external storage 162. In some embodiments, the subscriber device 160 includes a device key in the hardware and/or firmware of the subscriber device 160. In such embodiments, as will be described below, the headend 110 obtains the device key from the client side, e.g., during registration and/or pairing.

In some embodiments, the headend 110 also includes a service key generator 122 and an entitlement management message (EMM) generator 124. Transmission of EMMs 128 is generally in response to a request from the subscriber 160 to a service provider. Further, at the request of the service provider, the service key generator 122 generates service keys 126 and provides the service keys 126 to the EMM generator 124. In order to generate the EMMs 128, the EMM generator 124 obtains subscriber data, including at least one entitlement 118 for the subscriber (e.g., payment for a particular channel), from an internal or external storage 116 and combines with the service keys 126 to form EMMs 128. An EMM 128 typically includes fields such as the entitlement 118 for the subscriber, the service keys 126 encrypted with the device key(s) 114, and/or a data integrity check field, among others.

In some embodiments, the headend 110 further includes a control word (CW) generator 132, a scrambler 134, and an entitlement control message (ECM) generator 136. The control word generator 132 generates control words 138 and provides the control words 138 to the scrambler 134. The scrambler 134 obtains unencrypted media content 142 from an internal or external media content repository 143 and generates encrypted media content 146 by encrypting the media content 142 with the control words 138. For further protection, the ECM generator 136 encrypts the control word 138 using the service keys 126 provided by the service key generator 122. The encrypted control words are then included in the ECMs 144 to be transmitted together with the encrypted media content 146. As used herein, the terms "scramble" and "encrypt" are used interchangeably, so are the terms "scrambler" and "encryptor" in some embodiments.

On the client side, in some embodiments, the subscriber device 160 includes an EMM decoder 166, an ECM decoder 172, and a descrambler 176 in addition to the internal or external storage 162. In some embodiments, once the subscriber device 160 receives the encrypted media content 146, the descrambler 176 decrypts the encrypted media content 146 in preparation for rendering. In order to decrypt the media content 146, in some embodiments, the EMM decoder 166 obtains the device key 164 from the storage 162 and applies the device key 164 to the EMMs 128 in order to derive an entitlement 168 for the subscriber and the decrypted service key 169. The EMM decoder 166 further provides the entitlement 168 and the decrypted service key 169 to the ECM decoder 172. The ECM decoder 172 then applies the decrypted service key 169 to the ECMs 144 to derive a decrypted control word 174. The decrypted control word 174 is then used by the descrambler 176 to decrypt the encrypted media content 146. As used herein, the terms "descramble" and "decrypt" are used interchangeably, so are the terms "descrambler" and "decryptor" in some embodiments.

In some embodiments, in the key-based CA system 100, the key in each level is encrypted or decrypted with the key of the previous level. For example, the device key(s) 114 are used for encrypting the service keys 126 in the headend 110 and for decrypting the service keys 169 on the subscriber device 160. In some embodiments, the keys of the previous level are used for generating keys and/or decryption in other levels. For example, the device key(s) 114 are used as a seed for generating the service keys 126 and for deriving the service key 169. Further, in some embodiments, one key can be generated as a function of multiple seeds (or keys) and vice-versa.

As shown in FIG. 1, the CA system 100 is exposed to various attacks. For example, attempting to view content that one has not paid for, a user may use an illegitimate device to duplicate the uniqueness of the subscriber device 160 for key and/or content sharing. In another example, a subscriber who purchased one service (e.g., service A) but has not paid for another service (e.g., service B) may attempt to manipulate the entitlement for service A (e.g., in the EMMs 128) in order to gain access to service B. In yet another example, a user may modify the entitlement information in the EMMs 128 to prolong the service after the subscription expiration date. Typical off-the-shelf STBs have limited hardware and software resources to provide strong protection of the encrypted media content 146, the ECMs 144, the EMMs 128, and/or the device keys 114. As such, a CA system that merely relies on such STBs as security anchors is vulnerable to the above-mentioned attacks.

Smartphones (and other end-user devices, such as tablets, wearable devices, computers, and/or portable multifunction devices, etc.) are becoming increasingly common and affordable around the globe. Typically, a smartphone is paired with its human owner and capable of having a two-way communication with a remote server. Further, in near range, the smartphone is capable of establish a secure two-way communication channel with another device, e.g., via Wi-Fi and/or Bluetooth. In addition, relative to off-the-shelf STBs, smartphones have more capable resources (e.g., stronger CPUs) and are more difficult to clone. Accordingly, the smartphone-based CA system disclosed herein in accordance with embodiments leverages the above-mentioned properties of smartphone (e.g., affordability, communication capability, processing capability, and/or security) and uses the smartphone as a building block for security enhancement.

Figure 2A:
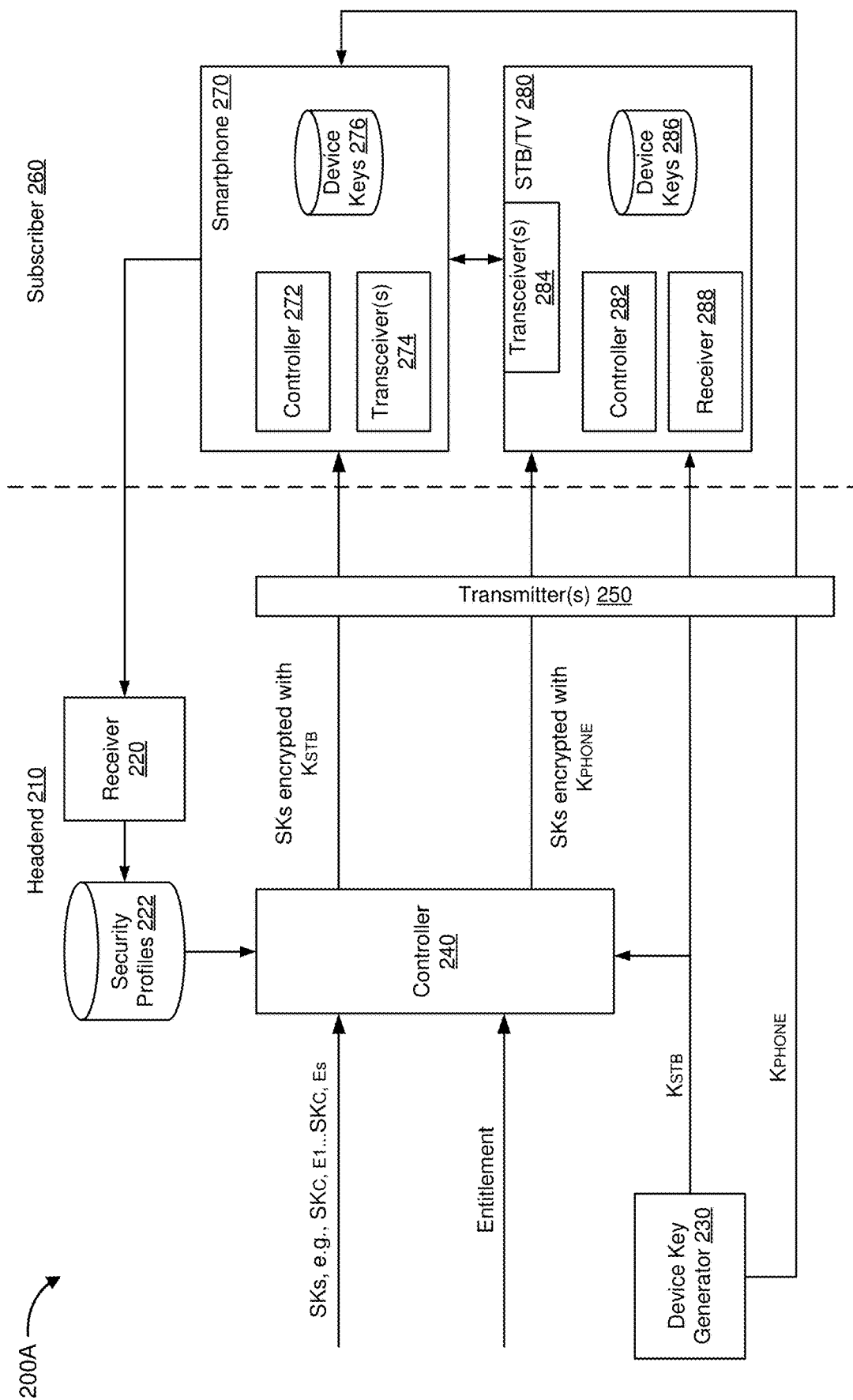
FIG. 2A is a block diagram of an exemplary headend system for secure key assignment and distribution in accordance with some embodiments.

FIG. 2A illustrates an exemplary smartphone-based CA system 200A for secure key assignment and distribution in accordance with some embodiments. The CA system 200A includes a server side and a client side as indicated by the dotted line. In some embodiments, the server side includes a headend 210 for transmitting media content, and the client side includes multiple receiving devices used by a subscriber 260 (or a user 260), e.g., a smartphone 270 and an STB/TV 280. In the smartphone-based CA system 200A, the smartphone 270 and the STB/TV 280 are paired, so that the smartphone 270 becomes a building block of the CA system 200A. In some embodiments, the headend 210 includes a receiver 220 for receiving information from the smartphone 270, a storage 222 for storing security profiles generated based on the information received from the receiver 220, a device key generator 230 for locating and/or delivering device keys to receiving devices used by the subscriber 260, a controller 240, and a transmitter 250 for key distribution.

In some embodiments, applications are installed on both the STB/TV 280 and the smartphone 270. When the subscriber 260 registers and creates a user account with the service provider, e.g., via the application on the smartphone 270, the profile of the smartphone 270 along with a user profile is transmitted from the smartphone 270 to the headend 210, e.g., via a transceiver 274 of the smartphone and through the receiver 220. In some embodiments, the profile of the smartphone 270 includes, but not limited to, the hardware, software, and/or firmware profile of the smartphone 270. Further, in some embodiments, the STB/TV 280 displays (e.g., on a display of the STB and/or the TV) an identifier and other information of the STB/TV 280 (e.g., the hardware, software, and/or firmware profile of the STB/TV 280).

In some embodiments, when the smartphone 270 used by the subscriber 260 is within a threshold distance from the STB/TV 280, the smartphone 270 obtains the displayed information, e.g., by scanning a QR code displayed on the STB/TV 280 in order to establish the pairing. In some embodiments, through one or more transceivers 274 of the smartphone 270 (e.g., WiFi and/or Bluetooth) and one or more transceivers 284 of the STB/TV 280 (e.g., WiFi and/or Bluetooth), the smartphone 270 and the STB/TV 280 exchange information and establish a secure near-range communication channel. Once the smartphone 270 and the STB/TV 280 are paired, the smartphone 270 sends the information of the STB/TV 280 along with the information exchanged with the STB/TV 280 to the headend 210, e.g., via the transceiver 274 and through the receiver 220. The headend 210 in turn stores the received information along with the information of the smartphone 270 and/or the user profile of the subscriber 260 received during registration in an internal or external storage 222 as a security profile for the subscriber 260. In some embodiments, the security profile for the subscriber 260 changes over time. For example, in case of a breach of a particular phone model, the headend 210 (e.g., the controller 240) updates security profiles stored in the storage 222 involving the particular phone model. Accordingly, in case the security profile for the subscriber 260 indicates that the subscriber 260 uses the particular phone model in the smartphone-based CA system 200A, the updates affect the security profile for the subscriber 260, e.g., indicating in the profile of the smartphone 270 that the smartphone 270 is less secure.

In some embodiments, based on the security profiles, the device key generator 230 generates device key suites. In some embodiments, the device key suites include at least one unique device key for the smartphone 270, denoted as $K_{PHONE}$, and another unique device key for the STB/TV 280 (different from the device key for the smartphone 270), denoted as $K_{STB}$. Once generated, the device keys are securely delivered to the smartphone 270 and the STB/TV 280 respectively, e.g., through the one or more transmitters 250 of the headend 210, the one or more transceivers 274 of the smartphone 270, the one or more transceivers 284 and/or the receiver 288 of the STB/TV 280. Upon receiving the respective device key, the smartphone 270 stores $K_{PHONE}$ in a secure storage 276 associated with the smartphone 270 and the STB/TV 280 stores $K_{STB}$ in a secure storage 286 associated with the STB/TV 280. In some embodiments, $K_{PHONE}$ is included in the hardware and/or firmware of the smartphone 270, e.g., burning the key to the device in the factory. Likewise, $K_{STB}$ is included in the hardware and/or firmware of the STB/TV 280. In such embodiments, the headend 210 locates $K_{PHONE}$ and $K_{STB}$ from the receiving devices during registration and/or pairing, e.g., the device key generator 230 obtains the device keys from the information received from the smartphone 270 and/or from the security profiles stored in the storage 222.

In some embodiments, for a channel C in an epoch E, the controller 240 obtains service keys, denoted as $\{SK_{C,E}^1, \ldots SK_{C,E}^S\}$, e.g., from the service key generator 122 (FIG. 1). Based on the security profiles stored in the storage 222, the controller 240 determines security rankings of the smartphone 270 and the STB/TV 280. Further, based on the security rankings, for the epoch E and for the channel C to which the subscriber 260 is entitled, the controller 240 decides how many service keys would be encrypted with $K_{PHONE}$ and how many service keys would be encrypted with $K_{STB}$ and encrypts the service keys $\{SK_{C,E}^1, \ldots SK_{C,E}^S\}$, accordingly.

In some embodiments, instead of determining separate security rankings, e.g., one for the smartphone 270 and the other for the STB/TV 280, the controller 240 calculates one security ranking for a tuple associated with the receiving devices, e.g., <STB ID, smartphone ID, communication type between the smartphone and the STB>. In some embodiments, the controller determines the combined security ranking during the pairing and updates the combined security ranking when at least one of the profile of the smartphone 270 or the profile of the STB/TV 280 changes. For example, in accordance with a newly discovered security flaw in the STB/TV 280, the controller 240 lowers the combined security ranking for the combination of the smartphone 270 and the STB/TV 280. In some embodiments, as will be described below with reference to FIG. 3, the controller 240 uses the combined security ranking for determining whether the receiving devices are secure enough to view the type of requested media content.

In some embodiments, in the case that a service key is encrypted with $K_{PHONE}$, the controller 240 directs the transmitter 250 to transmit the encrypted service key $SK_{C,E}^i$ to the smartphone 270. As used herein, the encrypted service key(s) that are transmitted to the smartphone 270 are denoted as $SK_{PHONE}$. On the other hand, in the case that a service key is encrypted with $K_{STB}$, the headend system 210 transmits the encrypted service key $SK_{C,E}^i$ to the STB/TV 280. As used herein, the encrypted service key(s) that are transmitted to the smartphone 270 are denoted as $SK_{STB}$. As will be described below, the encrypted service keys will then be used by the respective receiving device to decrypt the encrypted media content. In some embodiments, as described above with reference to FIG. 1, the encrypted service keys are transmitted in the EMMs 128 along with the entitlements for the subscriber 260. Upon entitlement renewal, the headend repeats the service key assignment and distribution process described herein.

On the receiving end, a controller 272 of the smartphone 270 uses the device key and the service key(s) received from the headend 210 (e.g., $K_{PHONE}$ and $SK_{PHONE}$) to perform the decryption, such as performing the functions by the descrambler 176, the ECM decoder 172, and the EMM decoder 166 in FIG. 1. Likewise, a controller 282 of the STB/TV 280 uses the device key and the service key(s) received from the headend 210 (e.g., $K_{STB}$ and $SK_{STB}$) to perform the decryption, such as performing the functions by the descrambler 176, the ECM decoder 172, and the EMM decoder 166 in FIG. 1. Further, as will be described below with reference to FIG. 3, the controllers 272 and 282 perform additional functions for security enhancement.

Figure 2B:
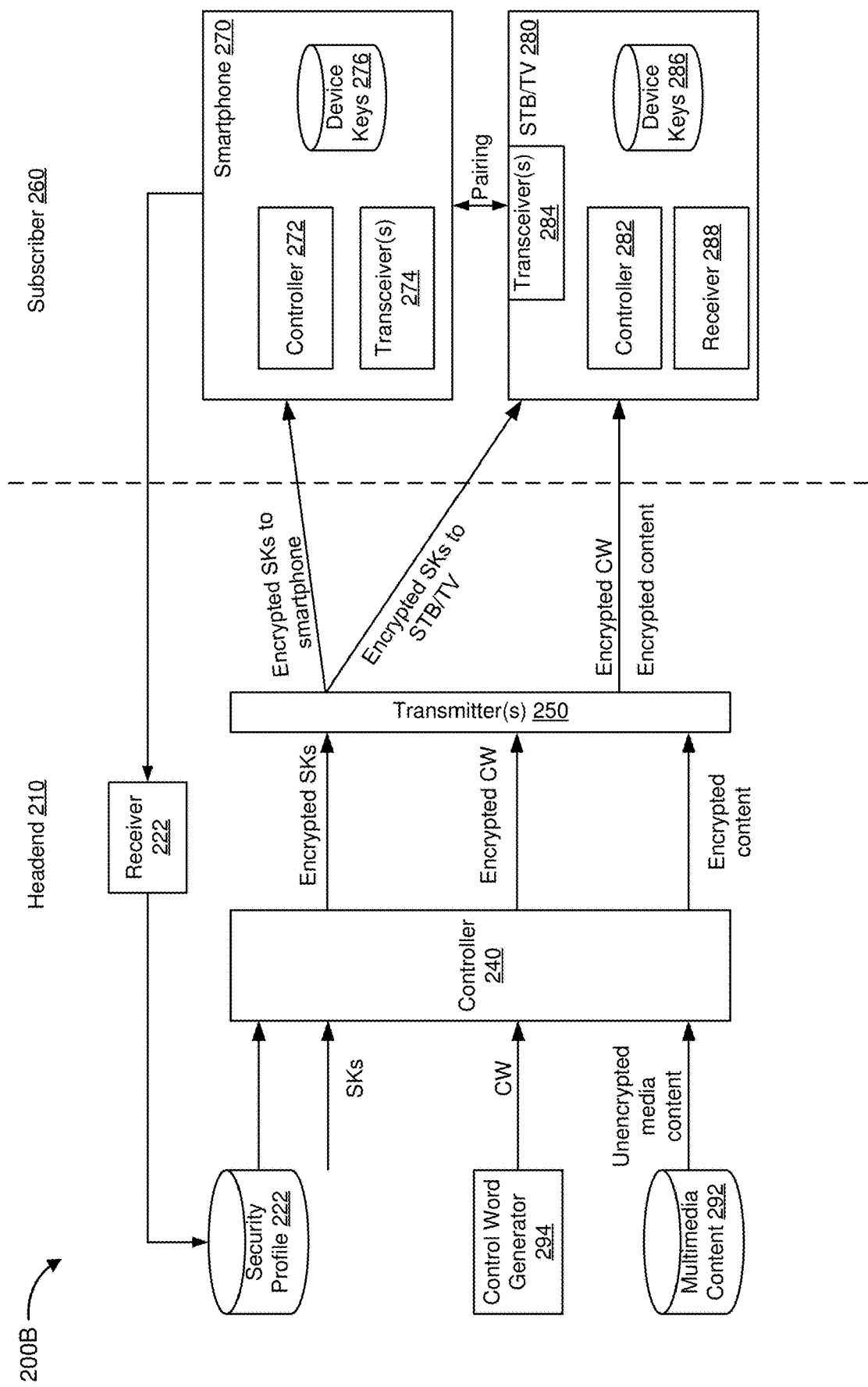
FIG. 2B is a block diagram of an exemplary headend system for secure content delivery in accordance with some embodiments.

FIG. 2B illustrates an exemplary smartphone-based CA system 200B for secure content delivery in accordance with some embodiments. In some embodiments, the exemplary smartphone-based CA system 200B uses the service key assignment and distribution mechanism described above with reference to FIG. 2A, and uses the service keys for content protection. As a result, elements common to FIGS. 2A and 2B include common reference numbers, and the differences are described herein for the sake of brevity.

In some embodiments, the controller 240 obtains unencrypted media content from a media content repository 292. In order to protect the media content, the controller 240 encrypts the media content with control words (CWs). In some embodiments, the controller 240 obtains control words from a control word generator 294 (e.g., the control word generator 132, FIG. 1). When encrypting media content associated with a channel C and for an epoch E, the controller 240 obtains control words from the control word generator 294. Further, for a control word, e.g., $CW_i$, the controller 240 encrypts the control word with a selected service key, e.g., calculating $ECW_i = F(CW_i, SK_{C,E}^1)$, where F is a reversible function and typically an encryption function. In some embodiments, for each $ECW_i$, there is an indicator regarding which SK is used for decrypting the respective $ECW_i$. In some embodiments, the controller 240 directs the transmitter(s) 250 to transmit the indicator to the subscriber 260 to facilitate the control word decryption. It should be noted that in some embodiments, there are n CWs in a particular crypto period, while there are s SKs. In other words, the controller 240 can choose to use some of the service keys per crypto period. As such, the index of the CW and the index of the SK may be different, e.g., i is different from l. As used herein, an "epoch" refers to the length of the minimal entitlement period, e.g., 30 to 60 days or shorter. Thus, the terms "epoch" and "entitlement period" are used interchangeably in some embodiments. Further as used herein, a "crypto period" refers to the time span during which a specific cryptographic key is authorized for use. For example, in every crypto period, the control word is changed.

The controller 240 then causes the transmitter 250 to transmit the encrypted control word, e.g., broadcasting the encrypted control word ECWi to be received by the STB/TV 280. Further, for every media content packet, the controller 240 chooses a control word, e.g., choosing CWj, and encrypts the media content packet with CWj before causing the transmitter 250 to transmit the encrypted media content packet to one of the receiving devices, e.g., broadcasting the encrypted media content along with the encrypted control word. In some embodiments, for each encrypted media content packet, there is an indicator regarding which CW is used for decrypting the respective packet. In some embodiments, the controller 240 directs the transmitter(s) 250 to transmit the indicator to the subscriber 260 to facilitate the media content decryption.

As described above with reference to FIG. 2A, based on the security rankings, in some embodiments, the headend 210 distributes a subset of encrypted service keys to the smartphone 270 and another subset of encrypted service keys (different from the subset to the smartphone 270) to the STB/TV 280. As such, a subset of encrypted control words would be decryptable by the smartphone 270 and another subset of encrypted control words would be decryptable by the STB/TV 280. It naturally follows that a subset of encrypted media content would be decryptable by the smartphone 270 and another subset of encrypted media content would be decryptable by the STB/TV 280. Accordingly, the smartphone-based CA system 200B disclosed herein in accordance with embodiments spreads the media content protection over two devices (e.g., the smartphone 270 and the STB/TV 280). Relative to the reliance of a single STB/TV as a security anchor in previously existing CA systems, the multi-point protection in the smartphone-based CA system described herein avoids the single point of failure in previously existing CA systems.

It should be noted that components are represented in the exemplary CA systems 200A and 200B for illustrative purposes. Other configurations can be used and/or included in the exemplary CA systems 200A and 200B. For example, in addition to storing the security profiles in the storage 222, entitlements and/or other subscriber data can be stored in the storage 222 as well. In other words, components can be divided, combined, and/or re-configured to perform the functions described herein. Further, although not shown in FIGS. 2A and 2B, the exemplary CA systems 200A and 200B can include other components and/or subcomponents to facilitate the secure key and content distribution. For example, the device key generator 230 can include one or more transmitters to transmit the device keys to the smartphone 270 and/or the STB/TV 280.

The various features of implementations described herein with reference to FIGS. 2A and 2B may be embodied in a wide variety of forms, and that any specific structure and/or function described herein is merely illustrative. In particular, although the CA systems 200A and 200B include the smartphone 270, those of ordinary skill in the art will appreciate that various other types of end-user devices, including but not limited to tablets, wearable devices, computers, and/or portable multifunction devices, can be used in place of the smartphone 270 in order to facilitate the security enhancement described herein.

Figure 3:
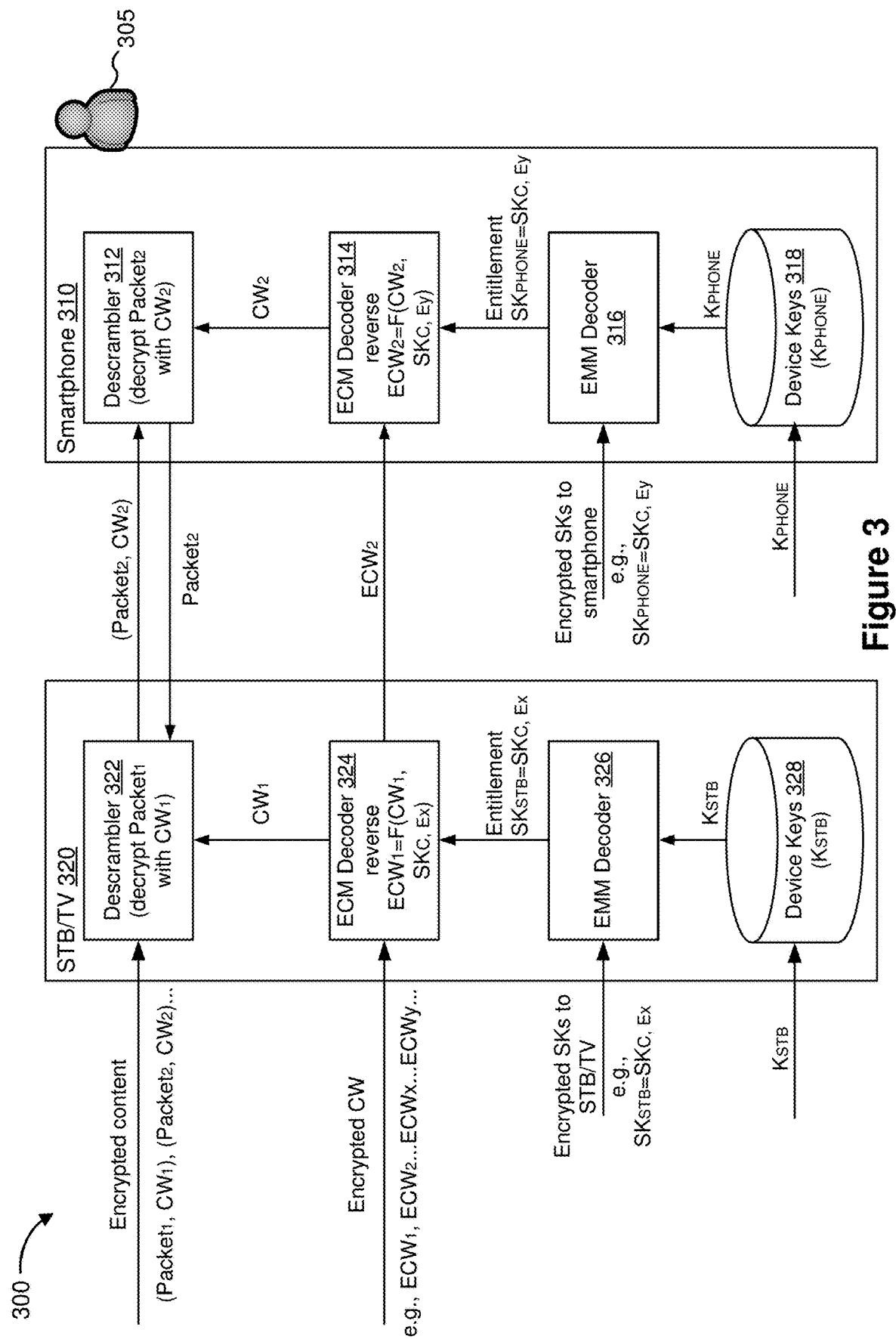
FIG. 3 is a block diagram illustrating media content decryption in a smartphone-based CA system in accordance with some embodiments.

FIG. 3 is a block diagram illustrating media content decryption in an exemplary smartphone-based CA system 300 in accordance with some embodiments. In some embodiments, the smartphone-based CA system 300 includes a first receiving device, e.g., a smartphone 310, and a second receiving device, e.g., an STB/TV 320. Although FIG. 3 illustrates the STB/TV 320 as the receiving device for receiving the encrypted media content from the headend (not shown), one or more of the smartphone 310 and the STB/TV 320 are capable of receiving and decrypting packets. As such, in some embodiments, the smartphone 310 can be the receiving device for receiving the encrypted media content from the headend.

As explained above with reference to FIGS. 2A and 2B, the smartphone 310 can include the transceiver(s) 274 (FIGS. 2A and 2B) for receiving packets from the headend 210 (FIGS. 2A and 2B). Further, the smartphone 310 can include the controller 272 (FIGS. 2A and 2B) to facilitate the decryption. In some embodiments, as shown in FIG. 3, the smartphone 310 includes a descrambler 312 to decrypt media content packets, an ECM decoder 314 to decrypt control words, an EMM decoder 316 for decrypting service keys as well as deriving entitlements for a subscriber 305, and a storage 318 for storing device keys. In some embodiments, the controller 272 shown in FIGS. 2A and 2B performs the function of the descrambler 312, the ECM decoder 314, and/or the EMM decoder 316. As such, in some embodiments, the functions performed by the descrambler 312, the ECM decoder 314, and/or the EMM decoder 316 are carried out by the controller 272 (FIGS. 2A and 2B).

Also as explained above with reference to FIGS. 2A and 2B, the STB/TV 320 can include the receiver 288 (FIGS. 2A and 2B) for receiving packets from the headend 210 (FIGS. 2A and 2B). Further, the STB/TV 320 can include the controller 282 (FIGS. 2A and 2B) to facilitate the decryption. In FIG. 3, the STB/TV 320 includes a descrambler 322 for decrypting media content packets, an ECM decoder 324 for decrypting control words, an EMM decoder 326 for decrypting service keys as well as deriving entitlements for the subscriber 305, and a storage 328 for storing device keys.

As such, in some embodiments, the controller 282 shown in FIGS. 2A and 2B performs the functions of the descrambler 322, the ECM decoder 324, and/or the EMM decoder 326.

In some embodiments, the subscriber 305 makes a purchase through the smartphone 310, e.g., the subscriber 305 chooses a channel C to purchase through the application on the smartphone 310. The smartphone 310 sends the purchase request to the headend. In some embodiments, following the process described above with reference to FIG. 2A, based on the security profiles, the headend decides whether the receiving devices (e.g., the smartphone 310 and/or the STB/TV 320) are secure enough for viewing the media content, e.g., calculating security rankings for the receiving devices based on the security profiles for the subscriber 305. Other methods for analyzing the security features of the receiving devices and for determining whether the receiving devices are secure enough for viewing the content can be used in place of or supplementing the calculation of the security rankings.

In the case that the receiving devices are secure enough, e.g., one or both of the security rankings are above a threshold associated with a type of media content, the subscriber 305 submits payment (e.g., by a payment processing application on the smartphone 310) and the entitlement for the subscriber 305 is recorded at the headend (e.g., in the subscriber data storage 116 in FIG. 1 and/or the security profile in FIGS. 2A and 2B). In some embodiments, the subscriber 305 submits the payment and the entitlement for the subscriber 305 is recorded when a combined security ranking of the smartphone 310 and the STB/TV 320 is above the threshold. Moreover, following the key assignment and distribution process described above with reference to FIG. 2A, the headend transmits the device keys and/or service keys to the smartphone 310 and/or the STB/TV 320. On the other hand, in the case that one or more of the receiving devices have weak security capabilities, the headend would not send the device keys and/or service keys to the insecure device(s).

For instance, a threshold associated with high value media content such as 4K content may be higher than a threshold associated with lower resolution media content. Based on the security profile for the subscriber 305, including the type of media content the subscriber 305 wants to view, the profile of the smartphone 310 and/or the profile of the STB/TV 320, the headend determines that the STB/TV 320 and/or the smartphone 310 are not secure enough to watch high value 4K media content and would not distribute the keys for content viewing. On the other hand, in the case that the subscriber 305 requests to watch lower resolution media content, based on the entitlement information and the profiles of the smartphone 310 and the STB/TV 320, the headend determines that the STB/TV 320 and/or the smartphone 310 are secure enough to watch such media content and would distribute the keys accordingly.

In order to view the media content, in some embodiments, the subscriber 305 chooses the media content to view, e.g., by selecting a channel to view from a package the subscriber 305 has purchased. Utilizing the pairing between the smartphone 310 and the STB/TV 320 (e.g., through the transceiver(s) 284 of the STB/TV 280 and the transceiver(s) 274 of the phone 270, FIGS. 2A and 2B), the smartphone 310 generates a request to the STB/TV 320 and instructs the STB/TV 320 to receive media content corresponding to the selected channel from the headend, e.g., using the smartphone 310 as a remote control to signal the STB/TV 320. In response to the channel viewing request, in some embodiments, the STB/TV 320 tunes to the requested channel and receives from the headend encrypted media content packets associated with the channel through a one-way communication channel (e.g., via satellite communication).

For every received encrypted media content packet, the STB/TV 320 determines whether it is encrypted with a control word that can be generated. For instance, in the case that $SK_{C,E}^{1}$ that is used for decrypting the control word $CW_1$ associated with a first media content packet $Packet_1$ is part of $SK_{STB}$, the STB/TV 320 decrypts $Packet_1$. On the other hand, in the case that $SK_{C,E}^{2}$, which is used for decrypting the control word $CW_2$ associated with a second media content packet $Packet_2$, is part of $SK_{PHONE}$, the STB/TV 320 forwards the packet (while still encrypted) to the smartphone 310 along with the encrypted control word $CW_2$, e.g., via a secure communication channel between the smartphone 310 and the STB/TV 320.

In particular, on the STB/TV 320 side, to decrypt $Packet_1$, the EMM decoder 326 of the STB/TV 320 determines that the EMM decoder 326 has received the encrypted service key $SK_{C,E}^{x}$ that is part of $SK_{STB}$ in the EMM messages from the headend. The EMM decoder 326 obtains the device key $K_{STB}$ from the storage 328 and applies the device key $K_{STB}$ to $SK_{C,E}^{x}$ to the encrypted service key $SK_{C,E}^{x}$, e.g., in the EMMs, in order to decrypt $SK_{C,E}^{x}$. The decrypted $SK_{C,E}^{x}$ is provided to the ECM decoder 324 for decrypting the encrypted $CW_1$ received from the headend, e.g., in the ECMs. In order to decrypt $CW_1$, the ECM decoder 324 applies the decrypted $SK_{C,E}^{x}$ to the encrypted $CW_1$ to derive the unencrypted $CW_1$, e.g., by executing a reverse function of $ECW_1=F(CW_1, SK_{C,E}^{x})$. The ECM decoder 324 then provides the unencrypted $CW_1$ to the descrambler 322, which uses the unencrypted $CW_1$ to decrypt $Packet_1$.

On the smartphone 310 side, the smartphone 310 receives the encrypted $Packet_2$ forwarded by the STB/TV 320. In response to receiving the encrypted $Packet_2$, the EMM decoder 316 of the smartphone 310 determines whether the EMM decoder 316 has received the encrypted service key $SK_{C,E}^{y}$ that is part of $SK_{PHONE}$ in the EMMs from the headend. In the case that the encrypted service key $SK_{C,E}^{y}$ that is part of $SK_{PHONE}$ in the EMMs from the headend, the EMM decoder 316 obtains the device key $K_{PHONE}$ from the storage 318 and applies the device key $K_{PHONE}$ to $SK_{C,E}^{y}$ to decrypt $SK_{C,E}^{y}$. The decrypted $SK_{C,E}^{y}$ is then provided to the ECM decoder 314 and the ECM decoder 314 applies the decrypted $SK_{C,E}^{y}$ to the encrypted $CW_2$ from the headend, e.g., in the ECMs, in order to derive the unencrypted $CW_2$, e.g., by executing a reverse function of $ECW_2=F(CW_2, SK_{C,E}^{3})$. The ECM decoder 314 then provides the unencrypted $CW_2$ to the descrambler 312, which uses the unencrypted $CW_2$ to decrypt $Packet_2$. The smartphone 310 thus decrypts the encrypted media content packet and sends back the unencrypted $Packet_2$ to the STB/TV 320 over the secure channel established during the paring with the STB/TV 320.

In some embodiments, for performance consideration, the smartphone 310 generates unencrypted service keys which are part of $SK_{PHONE}$ and transmits the decrypted service keys to the STB/TV 320. In such embodiments, instead of transmitting the encrypted media content packets and/or the encrypted control words to the smartphone 310, the STB/TV 320 receives the decrypted service keys from the smartphone 310 and uses the decrypted service keys to decrypt the encrypted media content packets and/or the encrypted control words. In some embodiments, for security, the decrypted service keys are transmitted over a secure channel between the STB/TV 320 and the smartphone 310. For example, the decrypted service keys may be locally encrypted prior to transmission.

In some embodiments, to further protect the media content, the smartphone 310 embeds watermarking in the packets sent back to the STB/TV 320. In some embodiments, the embedded watermarking includes a unique identity, so that the media content is identifiable, thus providing deterrence against pirated copies. In such embodiments, the smartphone 310 to receives the encrypted media content, decrypts it, embeds watermarking, and transmits the decrypted media content back to the STB/TV 320. As such, the secure CA system 300 utilizes the communication capability and/or processing capability of the smartphone 310 to enhance security.

Though not shown in FIG. 3, in some embodiments, the STB/TV 320 and the smartphone 310 include additional subcomponents to facilitate the device pairing. For example, the STB/TV 320 can include a display (e.g., a display of TV and/or a display of an STB) connectable to the controller 282 (FIGS. 2A and 2B) and the smartphone 310 can include an image capturing device (e.g., a scanner or a camera). When being directed by the controller 282 (FIGS. 2A and 2B), the display displays an identifier of the STB/TV 320 that is scannable by the smartphone 310, e.g., a QR code with embedded information of the STB/TV 320. The smartphone 310 scans the displayed information and extracts the information to facilitate the pairing in accordance with some embodiments.

The smartphone-based CA system disclosed herein in accordance with embodiments improves security over previously existing CA systems. By including the smartphone as a building block in the smartphone-based CA system, the smartphone-based CA system leverages a more capable receiving device to protect the media content against various attacks and avoids having a single point of failure as in previously existing CA systems.

For instance, cloning is preventable, since cloning a smartphone is more difficult to accomplish than cloning an off-the-shelf STB. In another example, because each service has its own unique entitlements and the encrypted service keys included in the EMMs are specific for a channel in an epoch, the entitlement cannot be reused for another service. Nor can the entitlement be reused for the same service and another epoch. As such, the key assignment and distribution mechanism described above with reference to FIG. 2A protects the media content against potential CA service manipulation and entitlement manipulation. In yet another example, because a subset of packets is decryptable by the smartphone, a hacker would have to distribute the encrypted control words to the smartphone in order to obtain the decrypted control words for content decryption. As such, control word sharing is complicated. Further, because the smartphone is capable of embedding watermarks in the decrypted media content packets to the STB/TV, content sharing can be detected. As such, the secure content delivery mechanism described above with reference to FIG. 2B protects the media content against potential key sharing and content sharing.

In some embodiments, the key and content delivery mechanisms described herein are dynamic. FIGS. 4A-4D are block diagrams illustrating dynamic key and content delivery in exemplary smartphone-based CA systems 400A-400D in accordance with some embodiments. Elements common to these figures include common reference numbers, and the differences are described herein for the sake of brevity.

To that end, FIG. 4A is a block diagram 400A illustrating service key assignment and distribution in an exemplary CA system 400A, where a smartphone 420 used by a subscriber 405 is more secure than an STB/TV 1 430-1 (e.g., an off-the-shelf STB) in accordance with some embodiments. In FIG. 4A, the subscriber 405 uses the smartphone 420 to register with a headend 410 (e.g., the headend system 210, FIGS. 2A and 2B). The headend 410 receives a profile of the smartphone 420 (e.g., hardware serial number, model number, configuration, firmware version, software installed, etc.) and a user profile of the subscriber 405 (e.g., user information and/or user entitlement). Once the smartphone 420 is paired with the STB/TV 1 430-1, the smartphone 420 obtains a profile of the STB/TV 1 430-1 and transmits the profile of the STB/TV 1 430-1 to the headend 410. As explained above with reference to FIGS. 2A and 2B, based on the profiles, the headend 410 (e.g., the controller 240, FIG. 2) stores a security profile for the subscriber 405, locates two distinct device keys, and/or distributes one device key to the smartphone 420, e.g., $K_{PHONE}$, and the other device key to the STB/TV 1 430-1, e.g., $K_{STB1}$.

In some embodiments, as explained above with reference to FIGS. 2A and 2B, upon establishing the security profile for the subscriber 405, e.g., including the profile of the smartphone 420, the profile of STB/TV 1 430-1, and the user profile of the subscriber 405, the headend 410 calculates a first security ranking for the smartphone 420 and a second security ranking for the STB/TV 1 430-1, e.g., calculating the respective security ranking as a function of attributes assigned to security features in hardware, software, and/or firmware of the respective receiving device.

Further, based on the security rankings, the headend 410 determines how many of the service keys would be distributed and used by the smartphone 420 and how many would be distributed and used by the STB/TV 1 430-1. For instance, in the case that the first security ranking is higher than the second security ranking, e.g., the smartphone 420 has more hardware, software, and/or firmware capabilities than the STB/TV 1 430-1 to protect media content from hacking, the headend 410 assigns more service keys to the smartphone 420 than the STB/TV 1 430-1.

As shown in FIG. 4A, for instance, the headend 410 obtains three service keys, e.g., $\{SK_{C,E}^1, SK_{C,E}^2, SK_{C,E}^3\}$. For a specific epoch E and for every channel C to which the subscriber 405 is entitled, based on the security rankings, the headend 410 assigns two service keys to the smartphone 420, e.g., $SK_{PHONE}=\{SK_{C,E}^1, SK_{C,E}^2\}$ and one service key to the STB/TV 1 430-1, e.g., $SK_{STS1}=SK_{C,E}^3$. The headend 410 then encrypts the service key set $SK_{PHONE}$ with the device key $K_{PHONE}$ and encrypts the service key $SK_{STB2}$ with the device key $K_{STB2}$. The encrypted service keys are then securely transmitted to the respective receiving devices, e.g., transmitting the encrypted $SK_{PHONE}$ set to the smartphone 420 and transmitting the encrypted $SK_{STB1}$ to the STB/TV 1 430-1. The ratio of 2:1 with respect to the service keys assignment and distribution shown in FIG. 4A is merely illustrative. Those of ordinary skill in the art will appreciate that other ratios based on the calculation of the security rankings, which is further determined based on the security profile of the subscriber 405, can be determined and/or configured through the headend 410.

FIG. 4B is a block diagram illustrating service key assignment and distribution in an exemplary CA system 400B, where an STB/TV 2 430-2 (e.g., an STB with a secure chip) is approximately as secure as the smartphone 420 in accordance with some embodiments. In FIG. 4B, the smartphone 420 is paired with the STB/TV 2 430-2, e.g., through near-range communication transceivers such as the transceiver(s) 274 of the smartphone 270 and the transceiver(s) 284 of the STB/TV 280 (FIG. 2). Once the smartphone 420 is paired with the STB/TV 2 430-2, the smartphone 420 obtains a profile of the STB/TV 2 430-2 and transmits the profile of the STB/TV 2 430-2 to the headend 410. Based on the profiles, the headend 410 (e.g., the controller 240, FIG. 2) stores a security profile for the subscriber 405, which includes but not limited to the profile of the smartphone 420, the profile of the STB/TV 2 430-2, and/or the user profile of the subscriber 405. The headend 410 further locates and/or distributes one device key to the smartphone 420, e.g., $K_{PHONE}$, and another device key to the STB/TV 2 430-2, e.g., $K_{STB2}$.

In some embodiments, as explained above with reference to FIGS. 2A and 2B, based on the security profile for the subscriber 405, the headend 410 calculates a first security ranking for the smartphone 420 and a second security ranking for the STB/TV 2 430-2, e.g., calculating the respective security ranking as a function of attributes assigned to security features in hardware, software, and/or firmware of the respective receiving device. Further, based on the security rankings, the headend 410 determines how many of the service keys would be distributed and used by the smartphone 420 and how many would be distributed and used by the STB/TV 2 430-2. In the case that the first security ranking is the same as or approximately the same as the second security ranking, e.g., the smartphone 420 has sufficient CPU capacity to perform encryption and decryption and the STB/TV 2 430-2 has a security enhanced chip, the headend 410 assigns equal (or approximately equal) number of service keys to the smartphone 420 and the STB/TV 2 430-2.

For instance, in FIG. 4B, the headend 410 obtains two service keys, e.g., $\{SK_{C,E}^4, SK_{C,E}^5\}$. For a specific epoch E and for every channel C to which the subscriber 405 is entitled, based on the security rankings, the headend 410 assigns one service key to the smartphone 420, e.g., $SK_{PHONE}=SK_{C,E}^4$ and one service key to the STB/TV 2 430-2, e.g., $SK_{STB2}=SK_{C,E}^5$. The headend 410 then encrypts the service key $SK_{PHONE}$ with the device key $K_{PHONE}$ and encrypts the service key $SK_{STB2}$ with the device key $K_{STB2}$. The encrypted service keys are then securely transmitted to the respective receiving devices, e.g., transmitting the encrypted $SK_{PHONE}$ to the smartphone 420 and transmitting the encrypted $SK_{STB2}$ to the STB/TV 2 430-2. The ratio of 1:1 with respect to the service keys assignment and distribution shown in FIG. 4B is merely illustrative. Those of ordinary skill in the art will appreciate that other ratios based on the calculation of the security rankings, which is further determined based on the security profile of the subscriber 405, can be determined and/or configured through the headend 410.

As shown in FIGS. 4A and 4B, the secure key assignment and distribution mechanism disclosed herein in accordance with embodiments is dynamic. Based on the security profiles, the headend adjusts the number of key and/or content delivered to a receiving device, e.g., periodically or in response to requests. If a receiving device is more capable to protect the media content, the headend would deliver more keys and content to the more secure receiving device. In some embodiments, in the case that one receiving device is compromised, the headend can deliver the keys and the content to the uncompromised pairing device as shown in FIG. 4C.

In FIG. 4C, initially, the smartphone 420 was paired with an STB/TV 430. In some embodiments, the headend 410 obtains an indication that the STB/TV 430 is compromised. For instance, the headend 410 can periodically obtain the profile of the smartphone 420, the profile of the STB/TV 430, and/or the user profile of the subscriber 405. Based on the analysis of the profiles, e.g., by comparing signatures of the hardware, software, and/or firmware of the smartphone 420 and/or the STB/TV 430, the headend 410 determines whether any tempering of the receiving device(s) has occurred. In some embodiments, leveraging its two-way communication capability, the smartphone 420 periodically obtains the profile of the STB/TV 430 through the pairing and reports any compromise to the headend 410. In response to obtaining the indication of compromise, the headend 410 ceases transmitting the keys, including but not limited to the service keys, the control words, and/or the device key, and/or the media content to the STB/TV 430. In some embodiments, the smartphone 420 ceases the communication path between the smartphone 420 and the STB/TV 430, e.g., in response to detecting the compromise of the STB/TV 430 by the smartphone 420 and/or in response to being directed by the headend 410 to cease the pairing with the STB/TV 430. As such, without the pairing, the compromised STB/TV 430 would not be able to send a portion of the encrypted media content to the smartphone 420 for decryption.

In conjunction with ceasing the transmission of keys and content to the STB/TV 430, the headend 410 increases the number of keys assigned to the smartphone 420, encrypts the service keys with the device key assigned to the smartphone 420, and transmits the encrypted service keys to the smartphone 420. In other words, in the case that one of the receiving devices, e.g., the STB/TV 430 as shown in FIG. 4C, the CA system described herein in accordance with embodiments encrypts and sends all of the encrypted keys along with the encrypted media content to the uncompromised device. Without the keys, even if the compromised receiving device obtains the encrypted media content, the compromised receiving device would not be able to decrypt and derive the media content.

In addition to being able to dynamically adjust the number of keys and the amount of media content delivered, the secure CA system disclosed herein in accordance with embodiments is flexible. In particular, the pairing information included in the security profile enables the flexibility of one watching entitled media content on different receiving devices.

For instance, in FIG. 4A, for high value media content, such as 4K videos, the off-the-shelf STB/TV 1 430-1 may not have capable hardware, firmware, and software to adequately protect the 4K videos. As such, in order to view the high value media content, the subscriber 405 may switch to a security enhanced receiving device, e.g., the STB/TV 2 430-2 with the secure chip in FIG. 4B. FIG. 4D illustrates receiving device switching in a smartphone-based CA system 400D in accordance with some embodiments.

In FIG. 4D, the smartphone 420 has been disconnected from the STB/TV 1, e.g., when the subscriber 405 with the smartphone 420 moving away from the STB/TV 1 430-1 and out of a threshold distance from the STB/TV 1 430-1 or by the subscriber 405 disconnecting the connection through the application on the smartphone 420. Further, the smartphone 420 is paired with the STB/TV 2 430-2, e.g., when the subscriber 405 with the smartphone 420 moving within a threshold distance from the STB/TV 2 430-2 or by the subscriber 405 establishing the connection through the application on the smartphone 420. Utilizing the near-range communication transceivers (e.g., the transceiver(s) 274 of the smartphone 270 and the transceiver(s) 284 of the STB/

TV 280, FIGS. 2A and 2B), a secure near-range communication channel is established between the smartphone 420 and the STB/TV 2 430-2.

In some embodiments, once the smartphone 420 is paired with the STB/TV 2 430-2, the smartphone 420 obtains the profile of the STB/TV 2 430-2 and transmits the profile of the STB/TV 2 430-2 to the headend 410. As explained above with reference to FIG. 4B, based on the profiles, the headend 410 assigns and distributes keys to the STB/TV 2 430-2. In some embodiments, the headend 410 re-locates and/or re-distributes a different device key to the smartphone 420 in response to a profile update, e.g., the pairing change. Also as explained above with reference to FIG. 4A, when the smartphone 420 was paired with the off-the-shelf STB/TV 1 430-1, the headend 410 delivers more keys and content to the smartphone 420. When the pairing changes such that the smartphone 420 is paired with the security enhanced STB/TV 2 430-2, based on the updated security profile, the headend 410 adjusts the number of keys and content assigned to the receiving devices accordingly. For instance, prior to the switching, the headend 410 splits the service keys according to a ratio of 2:1 between the smartphone 420 and the STB/TV 1 with the smartphone 420 being more secure and receiving more service keys. After the switching, with the STB/TV 2 430-2 having the secure chip, the headend 410 splits the service keys evenly between the smartphone 420 and the STB/TV 2 430-2. As such, the CA system disclosed herein allows content viewing on different receiving devices with continued security.

Figure 5:
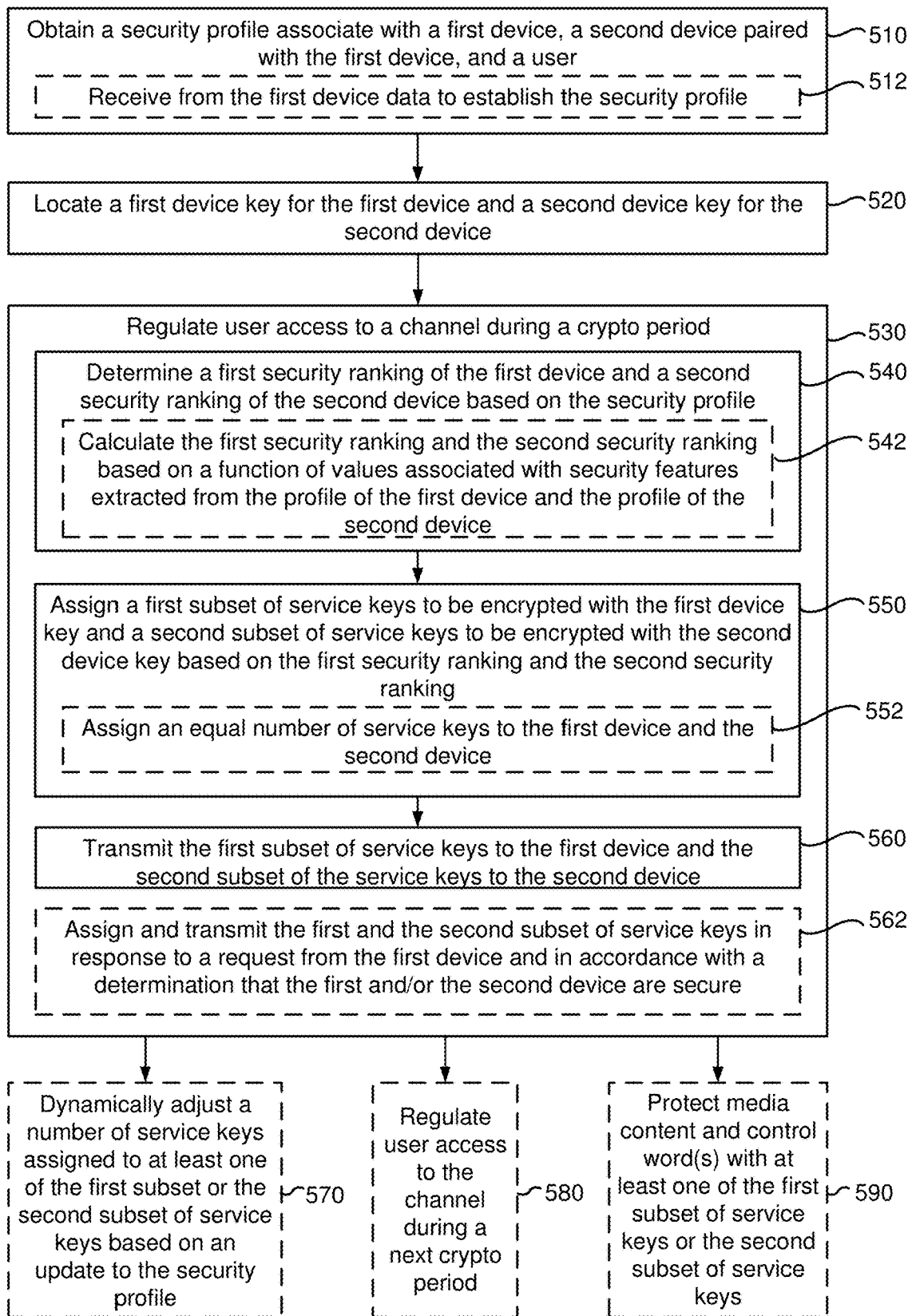
FIG. 5 is a flowchart illustrating a method for service key assignment and distribution in a smartphone-based CA system in accordance with some embodiments.

FIG. 5 is a flowchart representation of a method 500 for service key assignment and distribution in a CA system, in accordance with some embodiments. In some embodiments, the method 500 is performed at a headend (e.g., the headend 210 in FIGS. 2A and 2B and/or the headend 410 in FIGS. 4A-4D), which includes a controller (e.g., the controller 240, FIGS. 2A and 2B), at least one non-transitory storage for storing security profiles (e.g., the storage 222 in FIGS. 2A and 2B), a device key generator (e.g., the device key generator 230, FIG. 2A), and a transmitter (e.g., the transmitter 250, FIGS. 2A and 2B). Briefly, the method 500 includes obtaining a security profile including a profile of a first device, a profile of a second device paired with the first device, and a user profile; locating a first device key for the first device and a second device key for the second device; and regulating user access to a channel during an entitlement period, including determining a first security ranking of the first device and a second security ranking of the second device based on the security profile, and assigning a first subset of service keys to be encrypted with the first device key and a second subset of service keys to be encrypted with the second device key based on the first security ranking and the second security ranking, and transmitting the first subset of service keys to the first device and the second subset of service keys to the second device.

To that end, as represented by block 510, the method 500 includes the controller obtaining a security profile including a profile of a first device, a profile of a second device paired with the first device, and a user profile. In some embodiments, the headend further includes a receiver (e.g., the receiver 220, FIGS. 2A and 2B) to facilitate obtaining the security profile. For instance, the first device can be a smartphone, e.g., the smartphone 270 in FIGS. 2A and 2B, the smartphone 310 in FIG. 3, or the smartphone 420 in FIGS. 4A-4D; and the second device can be an STB or a smart TV, e.g., the STB/TV 280 in FIGS. 2A and 2B, the STB/TV 320 in FIG. 3, the STB/TV 1 430-1 in FIGS. 4A and 4D, or the STB/TV 2 430-2 in FIG. 4B. The profile of the smartphone can include hardware and subcomponent model number(s), type(s) and version(s) of operating system, application(s) installed, SIM information, device identifier(s), and/or serial number(s), etc. The profile of the STB/TV can include make and model, type of chip(s), identifier(s), and/or firmware update(s), etc.

As represented by block 512, in some embodiments, the receiver receives, from the first device the user profile, the profile of the first device including an identifier of the first device, the profile of the second device including an identifier of the second device, and data exchanged during pairing of the first device and the second device. The controller then establishes the security profile based on the profile of the first device, the profile of the second device, and the user profile. In some embodiments, upon establishing the security profile for the subscriber, the headend stores the security profile in the non-transitory storage.

For example, during registration or account setup, the smartphone sends the subscriber's information to the headend. Further, the STB/TV can display an identifier of the STB/TV for the smartphone to scan in near range. The smartphone scans the identifier of the STB/TV and utilizes the near-range communication device(s) to pair with the STB/TV. Once paired, the smartphone obtains further information about the STB/TV through the communication between the smartphone and the STB/TV. In some embodiments, the smartphone sends to the headend the information about the STB/TV, the smartphone, and the subscriber, as well as the communication between the smartphone paired with the STB/TV. Such information is then used by the headend (e.g., the controller 240, FIGS. 2A and 2B) to establish the security profile for the subscriber and stores the security profile in the storage.

The method 500 continues, as represented by block 520, with the device key generator locating a first device key for the first device and a second device key for the second device. In some embodiments, the first device key and the second device key are transmitted by the transmitter of the headend to the first device and the second device. For example, in FIG. 2A, the device key generator 230 generates the device key for the STB/TV 280 $K_{STB}$ and the device key for the smartphone 270 $K_{PHONE}$. Further, the device key generator 230 transmits (e.g., through the transmitter(s) 250) $K_{STB}$ to the STB/TV 280 and $K_{PHONE}$ to the smartphone 270. In some embodiments, the headend obtains the first device key and the second device key from the first device and the second device, e.g., once the first device key and the second device are paired. In some embodiments, the device key generator locates and manages the first device key and the second device key for encryption at the headend.

The method 500 continues, as represented by block 530, with the controller regulating user access to a channel during an entitlement period. In some embodiments, in order to regulate user access, as represented by block 540, the headend first determines a first security ranking of the first device and a second security ranking of the second device based on the security profile, as represented by block 540. Further, as represented by block 550, the headend regulates user access by assigning a first subset of service keys to be encrypted with the first device key and a second subset of service keys to be encrypted with the second device key based on the first security ranking and the second security ranking. Additionally, as represented by block 560, the headend regulates user access by transmitting the first subset of service keys to the first device and the second subset of service keys to the second device.

For example, in FIG. 4A, for a channel C in an epoch E, the headend 410 obtains three service keys $\{SK_{C,E}^1, SK_{C,E}^2, SK_{C,E}^3\}$ from a service key generator (e.g., the service key generator 122, FIG. 1). For the epoch E and for the channel C to which the subscriber 405 is entitled, the headend 410 determines the smartphone 420 has a higher security ranking than the STB/TV 1 430-1. As such, based on the security rankings, the headend 410 assigns a subset of the service keys, e.g., two service keys to the smartphone 420, denoted as $SK_{PHONE} = \{SK_{C,E}^1, SK_{C,E}^2\}$ and another subset of service keys, e.g., one service key to the STB/TV 1 430-1, denoted as $SK_{STB1} = SK_{C,E}^3$. The headend 410 then encrypts the service key set $SK_{PHONE}$ with the device key $K_{PHONE}$ and encrypts the service key $SK_{STB2}$ with the device key $K_{STB2}$. The encrypted service keys are then securely transmitted to the respective receiving devices, e.g., transmitting the encrypted $SK_{PHONE}$ set to the smartphone 420 and transmitting the encrypted $SK_{STB1}$ to the STB/TV 1 430-1.

In some embodiments, as represented by block 542, determining the first security ranking of the first device and the second security ranking of the second device based on the security profile includes associating values to security features extracted from the profile of the first device and the profile of the second device; and calculating the first security ranking of the first device and the second security ranking of the second device based on a function of the values associated with the security features.

For instance, the headend extracts security features such as the processor type and speed, types of encryption and decryption software, storage capacity, etc. In some embodiments, the headend calculates the security rankings by assigning values to the security features, e.g., assigning 1 to a standard chip or an older version operating system in an off-the-shelf STB, assigning 2 to a secure chip in a security enhanced STB or a newer version firmware, assigning 3 to a crypto engine on a smartphone, etc. The headend then calculates the security rankings as a function of the values associated with the security features. In some embodiments, the values assigned to the security features are configurable, e.g., decreasing the value assigned to one type of chip overtime as more capable chips are developed, or decreasing the value assigned to one version of software in response to discovering security flaws.

Still referring to FIG. 5, in some embodiments, as represented by block 552, assigning the first subset of service keys to be encrypted with the first device key and assigning the second subset of service keys to be encrypted with the second device key based on the first and the second security ranking includes assigning an equal number of service keys in the first and the second subset of service keys in accordance with a determination that the first security ranking of the first device is approximately the same as the second security ranking of the second device. On the other hand, if the first security ranking and the second security ranking are not approximately the same, the headend would assign more service keys to be transmitted to the receiving device with the higher security ranking.

For instance, if a user has a secure smartphone, the security ranking of the smartphone is higher. As a result, the headend sends more service keys to the smartphone, e.g., distributing two service keys to the smartphone 420 and one service key to the off-the-shelf STB/TV 1 430-1 as shown in FIG. 4A. In contrast, if an STB has a secure chip, the security ranking of the STB is higher or approximately the same as the smartphone. As a result, the headend sends more service keys to the STB or evenly splits the number of service keys distributed to the smartphone and the STB, e.g., distributing one service key to the smartphone 420 and one service key to the STB/TV 2 430-2 with a secure chip as shown in FIG. 4B.

In some embodiments, as represented by block 562, the method 500 further includes: (a) receiving a request from the first device to access the channel; (b) determining whether or not at least one of the first device, the second device, or a combination of the first device and the second device is secure to access the channel based on the security profile in response to the request; and (c) performing assigning and transmitting of the first and the second subset of service keys in accordance with a determination that at least one of the first device or the second device is secure to access the channel.

In other words, in some embodiments, in response to a request from the first device (e.g., channel purchasing and/or subscribing to a service package), the headend analyzes the security features in the profiles and determines a security score for the first device and a security score for the second device. If the headend determines that at least one of the first or the second device is secure, e.g., the security score for the first device and/or the security for the second device are above a threshold, the headend assigns and transmits the first subset of service keys and/or the second subset of service keys. On the other hand, if the first device and/or the second device do not have the capacity to provide adequate protection of the media content, e.g., when the subscriber requests high value media content, such as 4K content, the headend may determine that the subscriber cannot watch the 4K content using the respective weak security receiving device and therefore will not send the corresponding service keys (possibly the respective device key) to the respective receiving device.

In some embodiments, as represented by block 570, the method 500 further includes detecting an update to the security profile, including at least one update to the profile of the first device, the profile of the second device, or the user profile, and adjusting a number of service keys assigned to at least one of the first subset or the second subset of service keys based on the update. In other words, a subscriber may switch to a different smartphone or a different STB for viewing subscribed media content. In some embodiments, the headend can detect the changes, e.g., receiving an update to the pairing information or receiving a report from the smartphone that the STB has been compromised. In response to detecting the update, the headend dynamically adjusts the service key assignments accordingly to utilize the more secure receiving device for content protection.

For instance, as shown in FIG. 4D, once the pairing changes, based on the updated security profile for the subscriber 405, the headend 410 determines the STB/TV 2 430-2 is as secure as the smartphone 420, which is more secure than the STB/TV 1 430-1. Accordingly, the headend changes the service key distribution ratio from 2:1 to 1:1 between two receiving devices. In another example, as shown in FIG. 4C, once the STB/TV 430 is compromised, the security ranking of the STB/TV 430 decreases. As a result, the headend 410 sends 100% of the service keys to the uncompromised receiving device.

In some embodiments, as represented by block 580, the method 500 further includes regulating user access to the channel during a next entitlement period. In some embodiments, regulating user access to the channel during the next entitlement period includes: (a) determining whether or not a user is entitled to the channel during the next entitlement period based on the user profile; and (b) in accordance with a determination that the user is entitled to the channel, determining a third security ranking of the first device and a fourth security ranking of the second device based on the security profile, and assigning a third subset of service keys to be encrypted with the first device key and a fourth subset of service keys to be encrypted with the second device key based on the third and the fourth security rankings, and transmitting the third subset of service keys to the first device and the fourth subset of service keys to the second device. As such, when it is time to renew the entitlements (for the next epoch), the headend performs the steps in block 530 for every subscriber.

In some embodiments, as represented by block 590, the method 500 further includes: (a) encrypting at least one control word with at least one of the first subset of service keys or the second subset of service keys; (b) encrypting media content associated with the channel with the at least one control word; and (c) transmitting the encrypted media content and the at least one control word to the first device or the second device. For example, as described above with reference to FIG. 2B, one set of service keys $SK_{PHONE}$ is distributed to the smartphone 270 and the other set $SK_{STB}$ is distributed to the STB/TV 280. The controller 240 uses the service keys to the encrypt the control words, e.g., calculating ECWi=F($CW_i$, $SK_{C,E}^{j}$). Further, for every media content packet, the controller 240 chooses a control word, e.g., choosing CWj, and encrypts the media content packet with CWj. As such, the media content is transmitted in encrypted form and the smartphone 270 is a building block in the smartphone-based CA system.

Figure 6:
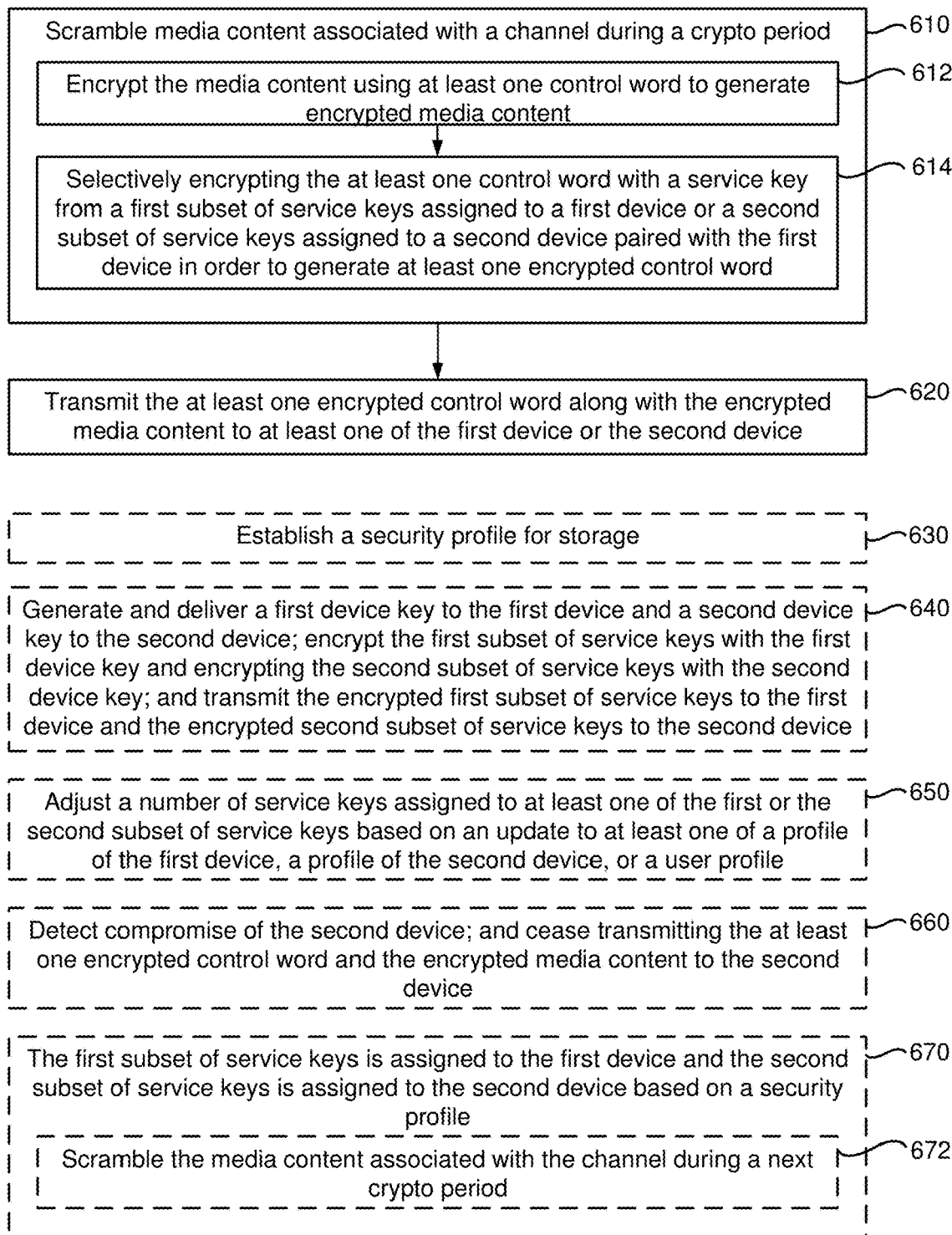
FIG. 6 is a flowchart illustrating a method for secure content delivery in a smartphone-based CA system in accordance with some embodiments.

FIG. 6 is a flowchart representation of a method 600 for secure content delivery in a CA system, in accordance with some embodiments. In some embodiments, the method 600 is performed at a headend (e.g., the headend 210 in FIGS. 2A and 2B and/or the headend 410 in FIGS. 4A-4D), which includes a controller (e.g., the controller 240, FIGS. 2A and 2B), at least one non-transitory storage for storing security profiles (e.g., the storage 222 in FIGS. 2A and 2B), a device key generator (e.g., the device key generator 230, FIG. 2A), and a transmitter (e.g., the transmitter 250, FIGS. 2A and 2B). Briefly, the method 600 includes scrambling media content associated with a channel during an entitlement period, including encrypting the media content using at least one control word to generate encrypted media content, and selectively encrypting the at least one control word with a service key from a first subset of service keys assigned to a first device or a second subset of service keys assigned to a second device paired with the first device in order to generate at least one encrypted control word; and transmitting the at least one crypted control word along with the encrypted media content to at least one of the first device or the second device.

To that end, as represented by block 610, the method 600 begins with the controller scrambling media content associated with a channel during an entitlement period. As represented by block 612, in some embodiments, the scrambling includes encrypting the media content using at least one control word to generate encrypted media content. Further, as represented by block 614, in some embodiments, the scrambling includes selectively encrypting the at least one control word with a service key from a first subset of service keys assigned to a first device or a second subset of service keys assigned to a second device paired with the first device in order to generate at least one encrypted control word. The method 600 continues, as represented by block 620, with the controller instructing the transmitter to transmit the at least one crypted control word along with the encrypted media content to at least one of the first device or the second device.

For example, as explained above with reference to FIG. 2B, when encrypting media content associated with a channel C, for an epoch E, the controller 240 encrypts a control word CWi and calculates the encrypted control word ECWi as a function of $CW_i$ and $SK_{C,E}^{i}$, e.g., ECWi=F($CW_i$, $SK_{C,E}^{j}$). Further, for every media content packet, the controller 240 chooses a control word, e.g., choosing CWj, and encrypts the media content packet with CWj before instructing the transmitter 250 to broadcast the encrypted media content packet along with the encrypted control word.

In some embodiments, as represented by block 630, the method 600 further includes receiving, from the first device or the second device, a user profile, a profile of the first device including an identifier of the first device, a profile of the second device including an identifier of the second device, and data exchanged during pairing of the first device and the second device; and establishing a security profile based on the profile of the first device, the profile of the second device, and the user profile for storage.

In some embodiments, as represented by block 640, the method 600 further includes generating and delivering a first device key to the first device and a second device key to the second device; encrypting the first subset of service keys with the first device key and encrypting the second subset of service keys with the second device key; and transmitting the encrypted first subset of service keys to the first device and the encrypted second subset of service keys to the second device.

In some embodiments, as represented by block 650, the method 600 further includes adjusting a number of service keys assigned to at least one of the first or the second subsets of service keys based on an update to at least one of a profile of the first device, a profile of the second device, or a user profile.

In some embodiments, as represented by block 660, the method 600 further includes detecting compromise of the second device; and ceasing transmitting the at least one encrypted control word and the encrypted media content to the second device. For instance, in FIG. 4C, once the headend 410 obtains an indication that the STB/TV 430 is compromised, the headend 410 ceases transmitting the keys (e.g., the service keys, the control words, and/or the device key) and/or the media content to the STB/TV 430.

In some embodiments, as represented by block 670, the first subset of service keys is assigned to the first device and the second subset of service keys is assigned to the second device based on a security profile. In some embodiments, the service key assignment is performed by determining a first security ranking of the first device and a second security ranking of the second device based on the security profile; and assigning the first subset of service keys to be encrypted with a first device key associated with the first device and assigning the second subset of service keys to be encrypted with a second device key associated with the second device based on the first security ranking and the second security ranking. In such embodiments, as represented by block 672, the method 600 further includes scrambling the media content associated with the channel during a next entitlement period. In some embodiments, the content scrambling of the channel during the next entitlement period includes determining whether or not a user is entitled to the channel based on the security profile; and in accordance with a determination that the user is entitled to the channel, encrypting the media content using one or more control words to generate the encrypted media content, and selectively encrypting the one or more control words with another service key from the first subset of service keys or the second subset of service keys, wherein a number of service keys assigned to the first subset of service keys and the second subset of service keys is adjusted based on updates to the security profile.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at a device including a controller, a first receiver for broadcast signals, and a second receiver and a transmitter for near-range communication, and a non-transitory memory:
    obtaining, via the first receiver, packets of encrypted media content corresponding to a channel for viewing, wherein a first subset of the packets is decryptable by the device using a first control word and a second subset of the packets is decryptable by a pairing device using a second control word;
    determining, by the controller, whether or not a respective encrypted media content packet for viewing is decryptable by the device based on whether or not the device has received a first service key for decrypting the first control word;
    decrypting and decoding, by the controller, the respective encrypted media content packet for viewing in accordance with a determination that the respective encrypted media content packet for viewing is decryptable by the device; and
    in accordance with a determination that the respective encrypted media content packet for viewing is not decryptable by the device, transmitting, via the transmitter, the respective encrypted media content packet for viewing to the pairing device, and obtaining, via the second receiver, a respective decrypted media content packet for viewing corresponding to the respective encrypted media content packet for viewing from the pairing device, wherein the respective decrypted media content packet for viewing is decrypted using the second control word, and the second control word is decrypted using a second service key received by the pairing device, wherein the first service key and the second service key are used for regulating access to the channel, and wherein the first service key is assigned to the device and the second service key is assigned to the pairing device based on security rankings of the device and the pairing device.

2. The method of claim 1, further comprising, receiving, via the second receiver, a request from the pairing device to tune into the channel associated with the encrypted media content packet for viewing.

3. The method of claim 1, wherein decrypted content including the respective decrypted media content packet for viewing obtained from the pairing device includes a watermark embedded by the pairing device.

4. The method of claim 1, further comprising, displaying an identifier of the device, wherein the identifier is scannable by the pairing device to establish a secure connection between the device and the pairing device.

5. The method of claim 4, further comprising, transmitting, via the transmitter, a profile of the device to the pairing device via the secure connection, wherein the profile of the device is forwarded by the pairing device to a server along with a profile of the pairing device and a user profile.

6. The method of claim 1, wherein:
    the non-transitory memory stores a device key obtained from a server; and
    decrypting and decoding, by the controller, the respective encrypted media content packet for viewing in accordance with the determination that the respective encrypted media content packet for viewing is decryptable by the device includes using the device key and the first service key assigned by the server to decrypt the respective encrypted media content packet for viewing.

7. A device comprising:
a first receiver for broadcast signals configured to to obtain packets of encrypted media content corresponding to a channel for viewing, wherein a first subset of the packets is decryptable by the device using a first control word and a second subset of the packets is decryptable by a pairing device using a second control word;
a controller to determine whether or not a respective encrypted media content packet for viewing is decryptable by the device based on whether or not the device has received a first service key for decrypting the first control word and decrypt and decode the respective encrypted media content packet for viewing in accordance with a determination that the respective encrypted media content packet for viewing is decryptable by the device;
a transmitter for near-range communication configured to transmit the respective encrypted media content packet for viewing to the pairing device in accordance with a determination that the respective encrypted media content packet for viewing is not decryptable by the device; and
a second receiver for the near-range communication configured to to obtain a respective decrypted media content packet for viewing corresponding to the respective encrypted media content packet for viewing from the pairing device, wherein the respective decrypted media content packet for viewing is decrypted using the second control word, and the second control word is decrypted using a second service key received by the pairing device, wherein the first service key and the second service key are used for regulating access to the channel, and wherein the first service key is assigned to the device and the second service key is assigned to the pairing device based on security rankings of the device and the pairing device.

8. The device of claim 7, wherein the second receiver is further operable to receive a request from the pairing device to tune into the channel associated with the encrypted media content packet for viewing.

9. The device of claim 7, wherein decrypted content including the respective decrypted media content packet for viewing obtained from the pairing device includes a watermark embedded by the pairing device.

10. The device of claim 7 further includes a display connectable to the controller to display an identifier of the device, wherein the identifier is scannable by the pairing device to establish a secure connection between the device and the pairing device.

11. The device of claim 10, wherein the controller is further operable to direct the transmitter to transmit a profile of the device to the pairing device via the secure connection, the profile of the device is forwarded by the pairing device to a server along with a profile of the pairing device and a user profile.

12. The device of claim 7 further includes a non-transitory memory to store a device key obtained from a server, wherein the controller uses the device key and the first service key assigned by the server to decrypt the respective encrypted media content packet for viewing.

13. A non-transitory memory storing one or more programs, which, when executed by a controller of a device, wherein the device includes a first receiver for broadcast signals, and a second receiver and a transmitter for near-range communication, cause the device to:
obtain, via the first receiver, packets of encrypted media content corresponding to a channel for viewing, wherein a first subset of the packets is decryptable by the device using a first control word and a second subset of the packets is decryptable by a pairing device using a second control word;
determine whether or not a respective encrypted media content packet for viewing is decryptable by the device based on whether or not the device has received a first service key for decrypting the first control word;
decrypt and decode the respective encrypted media content packet for viewing in accordance with a determination that the respective encrypted media content packet for viewing is decryptable by the device; and
in accordance with a determination that the respective encrypted media content packet for viewing is not decryptable by the device, transmit, via the transmitter, the respective encrypted media content packet for viewing to the pairing device, and obtain, via the second receiver, a respective decrypted media content packet for viewing corresponding to the respective encrypted media content packet for viewing from the pairing device, wherein the respective decrypted media content packet for viewing is decrypted using the second control word, and the second control word is decrypted using a second service key received by the pairing device, wherein the first service key and the second service key are used for regulating access to the channel, and wherein the first service key is assigned to the device and the second service key is assigned to the pairing device based on security rankings of the device and the pairing device.

14. The non-transitory memory of claim 13, wherein decrypted content including the respective decrypted media content packet for viewing obtained from the pairing device includes a watermark embedded by the pairing device.

15. The non-transitory memory of claim 13, wherein the one or more programs, which, when executed by the controller of the device, further cause the device to, display an identifier of the device, wherein the identifier is scannable by the pairing device to establish a secure connection between the device and the pairing device.

16. The non-transitory memory of claim 15, wherein the one or more programs, which, when executed by the controller of the device, further cause the device to, transmit a profile of the device to the pairing device via the secure connection, wherein the profile of the device is forwarded by the pairing device to a server along with a profile of the pairing device and a user profile.

17. The non-transitory memory of claim 13, wherein:
the non-transitory memory stores a device key obtained from a server; and
decrypting and decoding the respective encrypted media content packet for viewing in accordance with the determination that the respective encrypted media content packet for viewing is decryptable by the device includes using the device key and the first service key assigned by the server to decrypt the respective encrypted media content packet for viewing.

* * * * *